United States Patent [19]

Fling

[11] Patent Number: 4,639,783
[45] Date of Patent: Jan. 27, 1987

[54] VIDEO SIGNAL FIELD/FRAME STORAGE SYSTEM

[75] Inventor: Russell T. Fling, Fishers, Ind.

[73] Assignee: RCA Corporation, Princeton, N.J.

[21] Appl. No.: 676,814

[22] Filed: Nov. 30, 1984

[51] Int. Cl.$^4$ ............................................... H04N 5/14
[52] U.S. Cl. .................... 358/166; 358/138; 358/37
[58] Field of Search ............... 358/166, 167, 138, 140, 358/21 R, 105, 160, 141, 22, 180, 37; 365/230; 382/41

[56] References Cited

U.S. PATENT DOCUMENTS

| | | | |
|---|---|---|---|
| 4,109,276 | 8/1978 | Hopkins, Jr. et al. | 358/4 |
| 4,127,873 | 11/1978 | Katagi | 358/138 X |
| 4,168,509 | 9/1979 | Hartmann | 358/138 |
| 4,301,473 | 11/1981 | Wallace et al. | 358/166 |
| 4,394,688 | 7/1983 | Iida et al. | 358/166 X |
| 4,400,719 | 8/1983 | Powers | 358/21 |
| 4,402,009 | 8/1983 | Rathjens et al. | 358/138 X |
| 4,435,792 | 3/1984 | Bechtolsheim | 365/230 |

OTHER PUBLICATIONS

John P. Rossi, "Digital Techniques for Reducing Television Noise", SMPTE Journal, vol. 87, No. 3, Mar. 78, pp. 134–140.
R. H. McMann et al., "A Digital Noise Reducer for Encoded NTSC Signals", SMPTE Journal, vol. 87, No. 3, Mar. 78, pp. 129–133.

*Primary Examiner*—Howard W. Britton
*Assistant Examiner*—Victor R. Kostak
*Attorney, Agent, or Firm*—E. M. Whitacre; P. J. Rasmussen; E. P. Herrmann

[57] ABSTRACT

A video signal processing system which employs a frame memory having a single output is operated to provide both field and frame delayed signals. The frame memory is operated in a serial mode at twice the video signal sample rate. Video samples are input to the memory on alternate stages and alternate samples output from the memory are routed back into the vacant memory stages. Alternate samples output from the frame memory correspond to field and frame delayed samples.

8 Claims, 5 Drawing Figures

| 4Fsc CLOCK CYCLE | INPUT SAMPLE | MEMORY INPUT SAMPLES | MEMORY OUTPUT SAMPLES | NONE RED. INPUT SAMPLES |
|---|---|---|---|---|
| ⋮ | ⋮ | ⋮ | ⋮ | ⋮ |
| 1 (START FIELD 3) | 1,1,3 | X | 1,1,2<br>1,1,1 | 1,1,3<br>1,1,1 |
| 2 | 2,1,3 | X | 2,1,2<br>2,1,1 | 2,1,3<br>2,1,1 |
| 3 | 3,1,3 | 1,1,3<br>1,1,2 | 3,1,2<br>3,1,1 | 3,1,3<br>3,1,1 |
| 4 | 4,1,3 | 2,1,3<br>2,1,2 | 4,1,2<br>4,1,1 | 4,1,3<br>4,1,1 |
| ⋮ | ⋮ | ⋮ | ⋮ | ⋮ |
| 800 | 800,1,3 | 798,1,3<br>798,1,2 | 800,1,2<br>800,1,1 | 800,1,3<br>800,1,1 |
| 801 | 1,2,3 | 799,1,3<br>799,1,2 | 1,2,2<br>1,2,1 | 1,2,3<br>1,2,1 |
| 802 | 2,2,3 | 800,1,3<br>800,1,2 | 2,2,2<br>2,2,1 | 2,2,3<br>2,2,1 |
| 804 | 3,2,3 | 1,2,3<br>1,2,2 | 3,2,2<br>3,2,1 | 3,2,3<br>3,2,1 |
| ⋮ | ⋮ | ⋮ | ⋮ | ⋮ |
| 192000 | 800,240,3 | 798,240,3<br>798,240,2 | 800,240,2<br>800,240,1 | 800,240,3<br>800,240,1 |
| 192001 | X | 799,240,3<br>799,240,2 | X<br>X | X<br>X |
| 192002 (STOP FIELD 3) | X | 800,240,3<br>800,240,2 | X<br>X | X<br>X |
| 192003 (START FIELD 4) | 1,1,4 | X | 1,1,3<br>1,1,2 | 1,1,4<br>1,1,2 |
| 192004 | 2,1,4 | X | 2,1,3<br>2,1,2 | 2,1,4<br>2,1,2 |
| 192005 | 3,1,4 | 1,1,4<br>1,1,3 | 3,1,3<br>3,1,2 | 3,1,4<br>3,1,2 |
| ⋮ | ⋮ | ⋮ | ⋮ | ⋮ |

*Fig. 4*

VIDEO SIGNAL FIELD/FRAME STORAGE SYSTEM

This invention relates to the management of data storage in field/frame memories in video signal processing systems.

BACKGROUND OF THE INVENTION

It is known that the signal-to-noise ratio, S/N, of video signals can be enhanced in a television receiver by recursively filtering video signal using a one frame delay element. It is also known that picture flicker may be reduced by converting interlaced line scanned signals to non-interlaced signals using a field memory in combination with speed-up buffer line memories. Merging these two functions so that a single frame memory may be simultaneously utilized by both systems implies partitioning the frame memory into two fields with output connections to both fields. If the memory is realized in very large scale integrated, VLSI, form on a single semiconductor die, a relatively large number of output connections are necessary. This tends to increase packaging costs and to negatively affect system reliability. Alternatively frame memories produced without midpoint output connections would tend to be inapplicable to such merged functions.

It is an object of the present invention to provide an arrangement whereby frame memories having single output ports may be operated to provide output samples from both fields of stored information.

SUMMARY OF THE INVENTION

The present invention is a frame memory system coupled in a video signal path for serially inputting and outputting data. Video signal input data and data from the memory output port are coupled to the memory input port via a multiplexer. Data samples applied to the input port of the memory alternate between current video signal samples and delayed samples from the memory output port. Successive samples output from memory correspond respectively to samples from two consecutive video fields.

BRIEF DESCRIPTION OF THE DRAWING

FIG. 4 is a table indicating the occurrence of particular samples at different points in the FIG. 2 circuit for successive clock cycles.

DETAILED DESCRIPTION

The invention will be described in the environment of a digital TV receiver. In the figures, broad arrows between system elements designate multiwire connections for coupling multibit binary samples. Narrow arrows generally represent single conductor connections.

Figure 1:
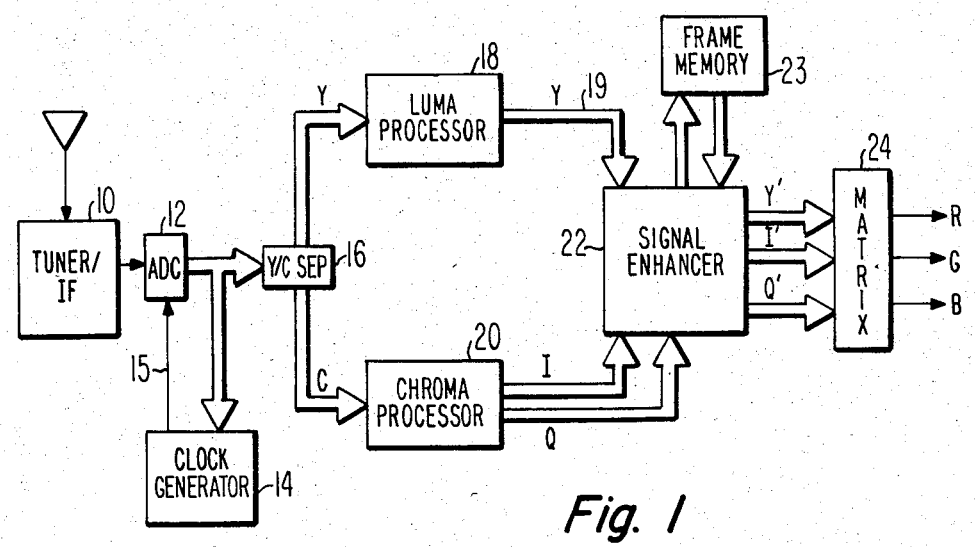
FIG. 1 is a block diagram of a video signal processing system employing a frame memory.

FIG. 1 shows the primary elements of a digital television receiver. In the figure, base-band analog composite video signal from a conventional tuner/IF stage 10 is applied to the analog signal input terminal of an analog-to-digital converter (ADC) 12. ADC 12, which may be an 8-bit flash converter, converts the analog composite video signal to binary samples occurring at a sample rate determined by a clocking signal applied to its clock input terminal, C. The clocking signal is developed by clock generator 14 which may be a phase locked loop arrangement that responds to the digitized burst component of the composite video signal. In the following description the system clocking signal is assumed to have a frequency of four times the color subcarrier frequency, $f_{sc}$.

Digitized video signal from ADC 12 is applied to circuit element 16 which separates the luminance, Y and chrominance, C, components of the video signal. The digitized luminance component is coupled to luma processor 18 wherein it may be peaked, cored, filtered or otherwise conditioned to produce desirable image characteristics on the receiver display tube. Luminance signals from processor 18 are coupled to signal enhancing circuit 22 which may include a frame averaging noise reducer or signal speed-up circuitry, e.g. field progressive scan circuitry. Processed luminance signal Y' from circuit 22 is thereafter applied to matrixing circuitry 24 in which it is combined with processed color difference signals to develop R, G, B color signals for driving the display tube (not shown).

Chrominance signal from element 16 is applied to chroma processor 20 in which it is demodulated to its quadrature related color difference signal components I and Q (or (R−Y), (B−Y)). The I and Q signals may also be filtered, hue corrected, saturation controlled, etc. The processed color difference signals from chroma processor 20 are applied to signal enhancement circuit 22 wherein they may be processed similarly to the lumininance signal. Signals I' and Q' developed by circuit 22 are applied to matrixing circuit 24 in which they are combined with the processed luminance signal Y'.

In FIG. 1, a frame memory 23 is coupled to signal enhancement circuit 22 to provide the requisite signal sample storage medium for the particular processing function performed in circuit 22.

Figure 2:
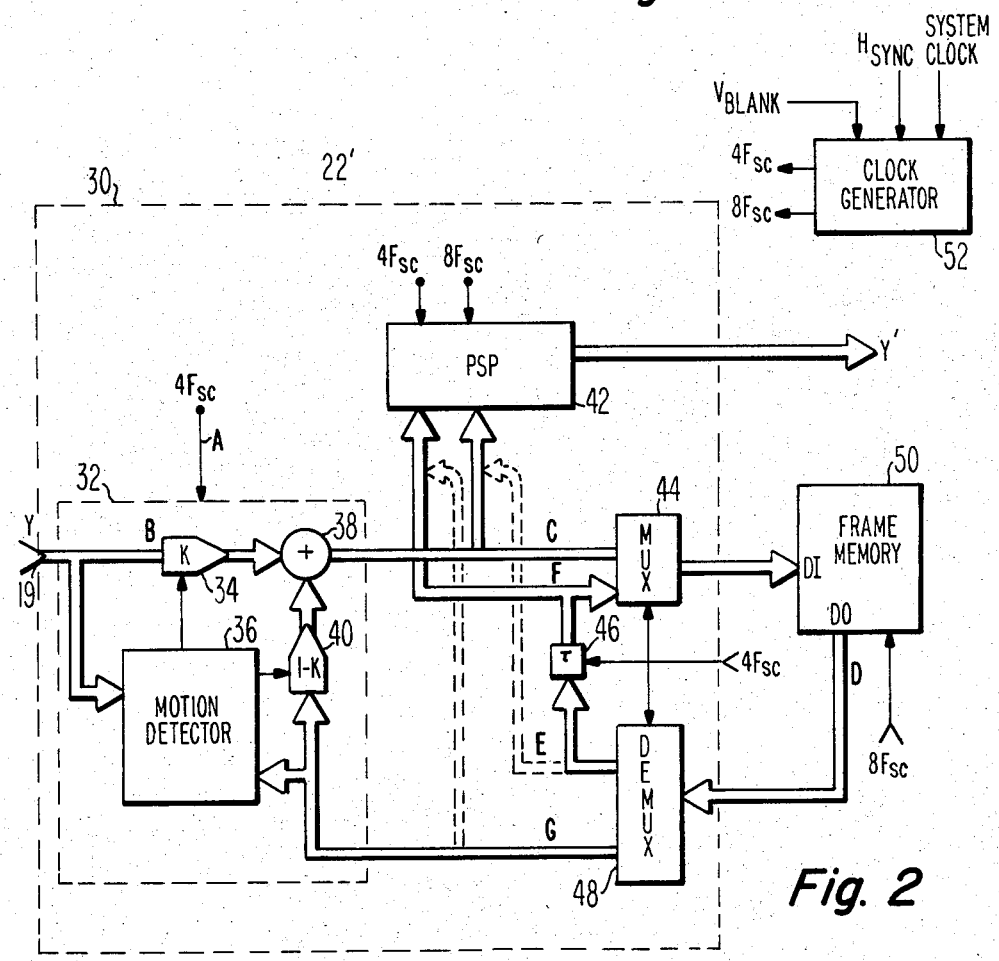
FIG. 2 is a block diagram of a noise reduction/progressive scan system using frame memory which may be substituted in the FIG. 1 system.

FIG. 2 contains illustrative circuitry which may be included in the signal enhancement circuit 22 of FIG. 1. It is assumed that the Y, I and Q signals are processed in component form. FIG. 2 includes only the Y signal processing circuitry. Similar circuitry is required to process the I and Q components, however, such additional circuitry may be configured to operate with different clock rates and memory size due to differences in bandwidth between the luminance signal and the I and Q signals. Alternatively, the I and Q signals may be time division multiplexed and processed in a single similar circuit with provision made for the multiplexing.

In FIG. 2, circuitry circumscribed in box 32, in cooperation with frame memory 50, is a recursive noise reduction system. For a detailed description of the operation of this type of noise reducer, see R. H. McMann et al., "A Digital Noise Reducer For Encoded NTSC Signal," SMPTE Journal, Vol. 87, No. 3, Mar. 1978, pp. 129–133 and J. P. Rossi, "Digital Techniques For Reducing Television Noise", SMPTE journal, Vol. 87, No. 3, Mar. 1978, pp. 134–140, which articles are incorporated herein by reference.

Briefly, the luminance signal Y is applied to scaling circuit 34 which scales applied samples by a factor K.

Samples delayed by exactly one frame period coupled from memory 50 via demultiplexor 48 are applied to scaling circuit 40 which scales the delayed samples by a factor 1-K where K is a positive value less than or equal to one. Scaled samples from scaling circuits 34 and 40 are added in adder circuit 38 and the sums are subsequently applied to the data input port of memory 50 via multiplexer 44. Current input samples Y and frame delayed samples are compared in circuit 36 which detects interframe signal differences and responsive thereto determines the value K to be applied to the scaling circuit. Samples provided by adder 38 correspond to noise reduced luminance signal.

PSP element 42 in cooperation with memory 50 speeds up the noise reduced luminance signal for field progressive scan display. An example of this type of progressive scan circuitry is described in U.S. Pat. No. 4,400,719 entitled "Television Display Systems With Reduced Line Scan Artifacts" which patent is incorporated herein by reference. By way of brief description, noise reduced luminance samples from adder 38 and samples delayed by one image field period from memory 50 via compensating delay element 46 and demultiplexer 48 are simultaneously applied to PSP element 42 at the sample rate of the luminance signal occurring on bus 19.

The current and delayed noise reduced samples are applied to a plurality of registers at the incoming sample rate and subsequently read from the registers at twice the incoming rate. The twice rate samples are multiplexed from the various registers in an order to produce an output signal Y' of non-interlaced line sequential signals, i.e. to produce a full frame of sequential lines in a field period. This is accomplished by alternating the loading and reading functions of the various registers at the normal line rate. An alternate input connection to PSP element 42 is shown by the busses drawn in phantom in FIG. 2. If PSP element 42 includes an internal demultiplexing circuit, a single input may be coupled to it from the output port of multiplexer 44.

Circuit 52 provides the requisite $4F_{sc}$ and $8F_{sc}$ clocks for operation of circuit 30. This circuit may be of conventional design and may respond to the system clock from clock generator 14, and the vertical blanking and horizontal sync components of composite video to effect proper timing.

Circuitry 30 including PSP processor 42, noise reduction circuitry 32, multiplexer 44, demultiplexer 48 and delay element 46 will desirably be integrated on a single integrated circuit. If circuitry 30 also includes like circuitry for processing I and Q signals, it will readily be appreciated that a very large number of input and output connections are required. Thus it becomes important that connections between circuitry 30 and the respective frame memories be minimized. This is accomplished by accessing both frame delayed signals from memory for the noise reduction circuitry and field delayed signals for the PSP circuitry from a single memory output port.

Frame memory 50 has a capacity for storing one frame of video samples and effectively operates in the serial mode. The memory has a data input port, DI, through which signals are loaded (written) into memory and a data output port, DO, at which delayed samples are output in the same sequence as they were loaded. Memory 50 is presumed to include the memory overhead circuitry to operate the memory as a serial delay line responsive to an input clock signal, $8 F_{sc}$, having a frequency which is twice the input sample rate at bus 19.

Memory 50 is operated at twice the rate of the incoming samples on bus 19. Processed luminance samples from adder 38 are applied to the memory such that they are serially loaded into every other memory location. Since the memory is operated at twice the sample rate the processed luminance samples traverse the frame memory and appear at the output port, DO, delayed by substantially one field period. The samples at output port DO are then routed back to the memory input port DI by way of demultiplexer 48 and multiplexer 44. These delayed samples are subsequently loaded into the alternate memory locations not occupied by samples input from adder 38 and course through the memory a second time. In so doing, they are delayed by a second field period or accrue a total delay of one frame period. Alternate samples read from memory are thus samples from successive fields respectively delayed by one field period and one frame period.

The memory operation will now be described with more particularlity with reference to the table of FIG. 4 and the timing chart of FIG. 5. The table illustrates sample numbers occurring at various points of the FIG. 2 circuit. In the illustrated example the memory is operated with start-stop clocks to reduce memory size. For NTSC signal sampled at a rate equal to four times the color subcarrier frequency, 910 samples are developed per horizontal line period. However, some of the samples occur in the horizontal sync, back porch and color burst intervals, which samples do not contain image information and, thus, need not be processed. In order to reduce memory size, only the last 800 of the 910 samples per line are processed by the FIG. 2 circuitry. In addition, horizontal lines which occur during the vertical blanking interval contain no image information, so the system is inoperative during this interval. This reduces the number of horizontal lines to be processed per field period to 240. The total number of luminance samples processed per field is 192000.

Figure 3:
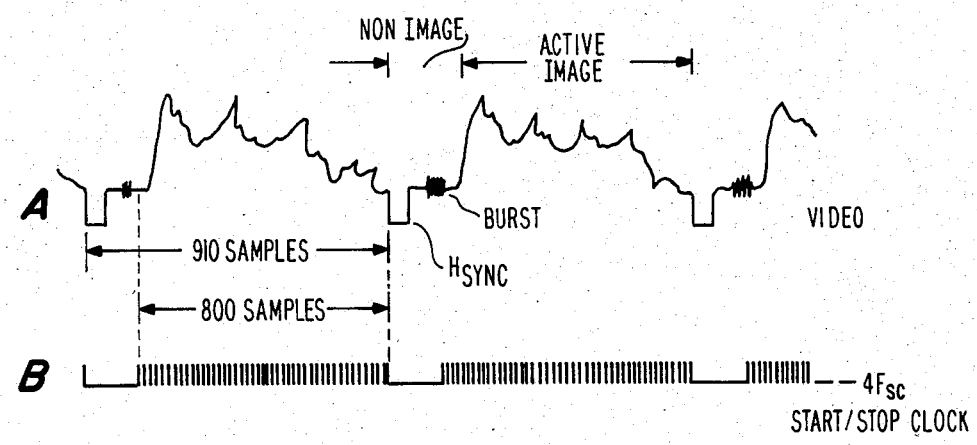
FIG. 3 is a waveform diagram showing the relationship of start/stop clock signals to composite video signal.

Start/stop clock operation is illustrated by the waveforms of FIG. 3. FIG. 3A shows generally the form of composite video signals including active image portions and non-image portions. FIG. 3B is intended to illustrate the portion of the video signal over which the clock is active. Note that clock operation includes a small portion of the non-image interval of each line. The operation of memory with start/stop clocks to reduce the memory size for video signal processing is known from e.g. U.S. Pat. No. 4,109,276 entitled "Memory Read/Write Organization For A Television Signal Processor" which is incorporated herein by reference.

The information in the FIG. 4 table was arbitrarily chosen to start with the first active sample of the first active horizontal line, after vertical blanking, of the third field. The start/stop clock cycle corresponding to this first sample is designated cycle 1 and all succeeding active image samples are consecutively numbered. The first column shows the clock cycle number. The second column designates the sample number occurring on bus 19 for the corresponding clock cycle. The sample number is designated by three numbers, the leftmost number corresponds to the first sample to be stored from a given horizontal line, the middle number corresponds to the active horizontal line number in a particular field, and the rightmost number corresponds to the particular field number. Sample numbers in the remaining columns of the table are designated in the same manner.

The third column labelled "memory input samples" lists the two samples applied to the memory input port, DI, for every period of the $4F_{sc}$ clock cycle listed in the first column. The column labelled "memory output samples" lists the two samples output from the memory 50 output port, DO, for the corresponding $4F_{sc}$ clock cycle. The column labelled "Noise Red. input samples" correspond to the samples applied to the scaling circuits 34 and 40 respectively during the corresponding $4F_{sc}$ clock cycle.

Figure 5:
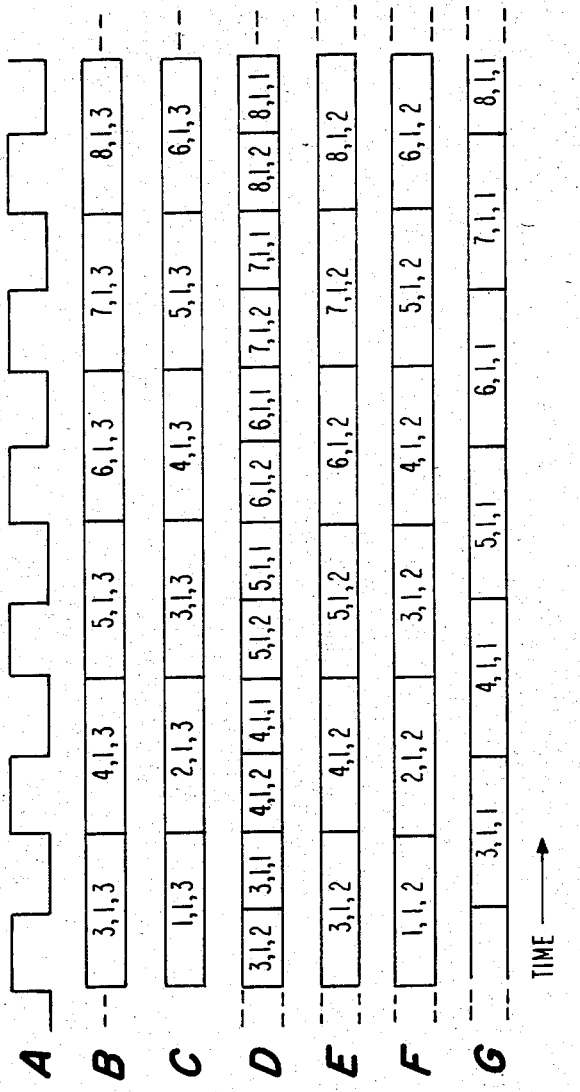
FIG. 5 is a timing diagram showing the relative timing relationship of representative samples at various points in the FIG. 2 circuit.

FIG. 5 shows the sample-time relationship at representative points in the FIG. 2 circuit. The rows in FIG. 5 designated A–F illustrate representative samples occurring simultaneously at points designated A–F respectively in FIG. 2.

FIG. 5A shows the $4 F_{sc}$ clock waveform which corresponds to the input sample rate. FIG. 5B illustrates a portion of the sequence of luminance input samples occurring on bus 19. Processed and delayed samples from adder 38 are illustrated in FIG. 5C. Samples are applied to the data input DI, of memory 50 by multiplexer 44. Multiplexer 44 under the control of the $4F_{sc}$ clock alternately applies samples from adder 38 and delay element 46 to the memory input. When the $4F_{sc}$ clock signal is in the high state, samples from adder 38 are coupled to the DI input and when the $4F_{sc}$ clock is in the low state samples from delay element 46 are applied to the DI input. Since the memory 50 is operated at twice the $4F_{sc}$ sample rate two samples are input to memroy 50 for each sample produced by adder 38, one from adder 38 and one from delay element 46.

FIG. 5D shows the two samples output from memory 50 for each $4F_{sc}$ clock period. By comparing FIG. 5D with FIG. 5C it may be seen that the samples output from memory 50 each sample period are respectively delayed by one field period less two sample periods and one frame period less two sample periods relative to samples input to memory from adder 38. Output samples from the frame memory are separated by demultiplexer 48 into a frame delayed signal relative to input samples on bus 19 (FIG. 5G) which is applied to scaling circuit 40 and a field delayed signal less two sample periods relative to the memory input (FIG. 5E) which is applied to delay element 46. By comparing FIGS. 5B and 5G it is seen that the samples applied to scaling circuit 40 are delayed by substantially one complete frame period relative to samples applied to scaling circuit 34 satisfying the criteria of the noise reduction circuitry.

In the noise reduction circuitry of FIG. 2 it is assumed that two $4F_{sc}$ clock periods are required to process samples through the scaling circuits 34 and 40 and adder 38. Thus the samples applied to the memory 50 input port DI are translated in time by two sample periods relative to the frame delayed samples output from memory 50. The two samples output by memory 50 during each $4F_{sc}$ sample period have like sample and line numbers. Therefore, the two samples input to memory 50 during each $4F_{sc}$ sample period must have like sample and line numbers (if the memory is operated in a serial mode). The samples applied to delay element 46 from the memory output (FIG. 5E) are advanced by two sample periods relative to the samples from adder 38. Delay element 46 is incorporated to impose a two sample delay (FIG. 5F) to align the samples fed back from the memory output with the samples provided from adder 38.

By comparing sample numbers in FIG. 5C and FIG. 5F, which samples occur on the two input ports of multiplexer 44, it is seen that two samples respectively delayed by exactly one field period are applied to PSP element 42 for each $4F_{sc}$ clock period.

During each field of video signal the system is clocked until the samples corresponding to the last samples of respective fields are produced at points C and F of FIG. 2. Now refer to both FIGS. 2 and 4. The last active sample of field 3 is sample (800, 240, 3) and occurs at clock cycle 192,000. However, at cycle 192,000 this sample is at point B. Two additional clock cycles are required to process this sample through the noise reduction circuit 32 and produce it at point C. When the two extra clock cycles are applied to process the last active image sample through circuit 32, two non-image samples are input into noise reduction circuit 32 from bus 19. These two samples are indicated by the X's in the "Input Sample" column at clock cycles 192,001 and 192,002 of FIG. 4.

At the beginning of the active image area of the next field, when the clock is restarted at cycle 192,003, the two non-image samples, X, are still present in circuit 32 and are loaded into memory during clock cycles of field 4. These two non-image samples will be read out of memory during the two extra clock cycles applied at the end of field 4 etc. In the illustrated example, for each field period, two more $4F_{sc}$ clock cycles than active image samples are required to process the image samples. However, since the system is operating with start/stop clocks, the two additional clock cycles are provided immediately after the active image portion of each field.

Other applications of the described memory system may not require extra clock cycles. For example, consider circuitry 32 removed from the FIG. 2 embodiment, and input bus 19 coupled directly to multiplexer 44. In this arrangement delay element 46 may also be eliminated so that samples occurring at points C, F and G are respectively nondelayed, delayed by one field period and delayed by one frame period. Samples from points C, F and G may be advantageously coupled to e.g., a two field type comb filter.

In the foregoing, the memory has been described as operating at 8 times the color subcarrier frequency which corresponds to approximately 28 MHz for NTSC signals. It will be readily appreciated by those skilled in the design of sampled data systems that the speed of memory operation may be reduced by subsampling the input signal, or transcoding the input samples to lower the rate at which samples are applied to the frame memory processing system. Alternatively, the analog signal may be sampled at a lower rate and the entire video system operated at a lower sample rate. The lower limit in the speed of memory operation is generally constrained to be at twice rate determined by the Nyquist sampling criterion relative to the input video signal.

What is claimed is:
1. A video signal processing system utilizing a memory for temporary storage of video signal samples occurring at a predetermined rate, comprising:
   a source of video signal samples;
   means for operating said memory in a serial mode wherein data is output from said memory in the same sequence data is loaded into said memory;
   means coupled to said source and an output port of said memory for forming a sequence of samples alternating between said video signal samples from said source and samples from said memory output port, and applying said sequence as input samples to said memory.

2. A video signal processing system utilizing a memory for temporary storage of substantially one frame of video signal samples occurring at a predetermined rate, comprising:
   a source of video signal samples;
   means for operating said memory in a serial mode including means for loading samples into and outputting samples from said memory at two times said predetermined rate and wherein data is output from said memory in the same sequence data is loaded into said memory;
   means coupled to said source and an output port of said memory for forming a sequence of samples alternating between said video signal samples from said source and samples from said memory output port, and applying said sequence as input samples to said memory.

3. The system set forth in claim 2 including means coupled to the output port of said memory for demultiplexing alternate samples output from said memory into first and second signal sequences, the first signal sequence corresponding to said video signal samples being delayed by substantially one field period and the second signal sequence corresponding to said video signal samples being delayed by substantially two field periods.

4. A video signal processing system utilizing a memory for temporary storage of video signal samples occurring at a predetermined rate, comprising:
   a source of video signal samples;
   means for operating said memory in a serial mode wherein data is output from said memory in the same sequence data is loaded into said memory;
   sampling means coupled to the output port of said memory for extracting alternate samples occurring at said output port;
   multiplexing means having first and second input ports and having an output port coupled to said memory;
   means for coupling the first input port of said multiplexing means to said source;
   means for coupling the second input port of said multiplexing means to said sampling means and wherein said multiplexing means alternately applies video signal samples from said source and said extracted samples to said memory.

5. The system set forth in claim 4 wherein the means for coupling said multiplexing means to said sampling means includes a sample delay means.

6. The system set forth in claim 5 wherein the means for coupling said multiplexing means to said source includes a noise reduction circuit and said sampling means applies alternate samples from said memory to said noise reduction circuit and wherein samples coupled to said memory from said noise reduction circuit correspond to noise reduced video signal samples.

7. The system set forth in claim 6 wherein said noise reduction circuit imposes a delay to samples coupled from said source to said multiplexing means and said sample delay means coupling said sampling means to said multiplexing means delays samples by a like amount as said noise reduction circuit.

8. The system set forth in claim 7 further including:
   a field progressive scan processing circuit for converting interlaced video signal to non-interlaced form, said progressive scan processing circuit having first and second input ports for coupling respective video samples relatively delayed by one field period; and
   respective means for coupling noise reduced signals delayed relative to each other by one field period to said progressive scan processing circuit first and second input ports from one of said memory output port and said multiplexer first and second input ports.

* * * * *